US009387845B2

(12) United States Patent
Yokoyama et al.

(10) Patent No.: US 9,387,845 B2
(45) Date of Patent: Jul. 12, 2016

(54) BRAKE APPARATUS

(71) Applicant: HITACHI AUTOMOTIVE SYSTEMS, LTD., Ibraki (JP)

(72) Inventors: Wataru Yokoyama, Kawasaki (JP); Takayasu Sakashita, Tokyo (JP); Jun Watanabe, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/359,427

(22) PCT Filed: Nov. 28, 2012

(86) PCT No.: PCT/JP2012/080735
§ 371 (c)(1),
(2) Date: May 20, 2014

(87) PCT Pub. No.: WO2013/081002
PCT Pub. Date: Jun. 6, 2013

(65) Prior Publication Data
US 2014/0284151 A1    Sep. 25, 2014

(30) Foreign Application Priority Data

Nov. 30, 2011   (JP) .................................. 2011/262976

(51) Int. Cl.
B60T 11/10        (2006.01)
B60T 8/32         (2006.01)
(Continued)

(52) U.S. Cl.
CPC ................. B60T 11/102 (2013.01); B60T 8/32 (2013.01); B60T 8/4872 (2013.01); B60T 13/146 (2013.01);
(Continued)

(58) Field of Classification Search
CPC ............ F16D 65/14; F16D 16/180068; F16D 2125/20; F16D 2125/40; B60T 11/102; B60T 11/103; B60T 11/105; B60T 13/588
See application file for complete search history.

(56) References Cited

U.S. PATENT DOCUMENTS

2007/0158148 A1* 7/2007 Ohtani et al. ................. 188/158
2008/0053760 A1* 3/2008 Oikawa et al. ............... 188/72.4
(Continued)

FOREIGN PATENT DOCUMENTS

JP      2009-101948      5/2009
JP      2009-264477      11/2009
(Continued)

OTHER PUBLICATIONS

International Search Report issued Jan. 15, 2013 in International Application No. PCT/JP2012/080735.

*Primary Examiner* — Vishal Sahni
(74) *Attorney, Agent, or Firm* — Wenderoth, Lind & Ponack, L.L.P.

(57) ABSTRACT

Upon a start of a release for releasing a braking state of a parking bake in a process of step 2, a control unit (13) performs hydraulic maintaining control by an ESC (11) in a subsequent step, step 3. As a result, a hydraulic pressure in a cylinder portion (46) increases according to a retraction of a piston (49) of a disk brake (41). If the control unit (13) determines in step 4 that the release of the parking brake has been completed, in step 5, the control unit (13) releases the hydraulic maintaining control by the ESC (11). The hydraulic pressure is temporarily increased in the cylinder portion (46) of the disk brake (41), thereby increasing an elastic deformation amount of a piston seal (56) to succeed in acquiring a sufficient rollback function.

10 Claims, 8 Drawing Sheets

(51) Int. Cl.
*B60T 8/48* (2006.01)
*B60T 13/58* (2006.01)
*B60T 13/66* (2006.01)
*B60T 13/74* (2006.01)
*F16D 65/00* (2006.01)
*B60T 13/14* (2006.01)
*F16D 55/226* (2006.01)
*F16D 65/18* (2006.01)
*F16D 66/00* (2006.01)

(52) U.S. Cl.
CPC ............ *B60T 13/588* (2013.01); *B60T 13/662* (2013.01); *B60T 13/741* (2013.01); *F16D 55/226* (2013.01); *F16D 65/0068* (2013.01); *F16D 65/18* (2013.01); *F16D 2066/005* (2013.01)

(56) References Cited

U.S. PATENT DOCUMENTS

| | | |
|---|---|---|
| 2010/0163351 A1 | 7/2010 | Sakashita et al. |
| 2011/0240418 A1* | 10/2011 | Tachiiri ................. 188/72.4 |
| 2014/0034430 A1* | 2/2014 | Fuse et al. ............. 188/72.4 |
| 2014/0231189 A1* | 8/2014 | Park et al. ............. 188/72.3 |

FOREIGN PATENT DOCUMENTS

| | | |
|---|---|---|
| JP | 2010-54038 | 3/2010 |
| JP | 2010-169248 | 8/2010 |
| JP | 2010-241389 | 10/2010 |
| JP | 2012-246988 | 12/2012 |
| WO | 2011/158855 | 12/2011 |

* cited by examiner

BRAKE APPARATUS

TECHNICAL FIELD

The present invention relates to a brake apparatus configured to apply a braking force to a vehicle such as a four-wheeled automobile.

BACKGROUND ART

Known examples of brake apparatuses mounted on vehicles such as four-wheeled automobiles include disk brakes. According to the disk brakes, a hydraulic pressure is externally supplied into a cylinder of a caliper to push and move a piston toward a surface side of a disk together with a brake pad, thereby generating a braking force. Among these disk brakes, there are known disk brake apparatuses equipped with a parking brake function, which are configured to function as a parking brake when the vehicle is stopped or parked in addition to generating a braking force when the vehicle is running (PTLs 1, 2, and 3).

CITATION LIST

Patent Literature

PTL 1: Japanese Patent Application Public Disclosure No. 2009-264477
PTL 2: Japanese Patent Application Public Disclosure No. 2010-54038
PTL 3: Japanese Patent Application Public Disclosure No. 2010-169248

SUMMARY OF INVENTION

The brake apparatuses equipped with the parking brake function according to the conventional techniques are configured to be able to cause the piston to operate as the parking brake without externally supplying the hydraulic pressure. However, during the operation as this parking brake, the hydraulic pressure is not externally applied to an elastic seal (i.e., a piston seal) that seals between the cylinder of the caliper and the piston, whereby the piston seal is elastically deformed only by a small amount at this time compared to the elastic deformation when the hydraulic pressure is supplied thereto.

Therefore, when the parking brake is released, the elastic deformation amount of the piston seal may be insufficient to acquire a rollback function, leading to a failure to return the piston to a normal braking release position. As a result, the disk may be in contact with the brake pad during its rotation, causing a pad drag phenomenon.

The present invention has been contrived in consideration of the above-described problem with the conventional techniques, and an object of the present invention is to provide a brake apparatus capable of returning a piston to a desired position by a piston seal when a parking brake is released, thereby preventing occurrence of a pad drag phenomenon.

(1) To achieve the above-described object, according to an aspect of the present invention, a brake apparatus includes a caliper including a piston sealed by an elastic seal provided in a hydraulic cylinder and configured to press brake pads disposed on both surfaces of a disk with use of the piston by supply of a hydraulic pressure into the hydraulic cylinder according to an operation performed on a brake pedal, a piston thrust mechanism disposed in the caliper and configured to thrust the piston by an external force independently from the supply of the hydraulic pressure, a piston holding mechanism disposed in the caliper and configured to hold the piston thrust by the piston thrust mechanism, and a pressure increase controller configured to temporarily increase the hydraulic pressure in the hydraulic cylinder after a start of a release of holding of the piston by the piston holding mechanism.

According to the present invention, it is possible to prevent occurrence of a pad drag phenomenon.

DESCRIPTION OF EMBODIMENTS

Hereinafter, brake apparatuses according to exemplary embodiments of the present invention will be described in detail with reference to the accompanying drawings based on an example in which they are mounted on a four-wheeled automobile.

Figure 1:
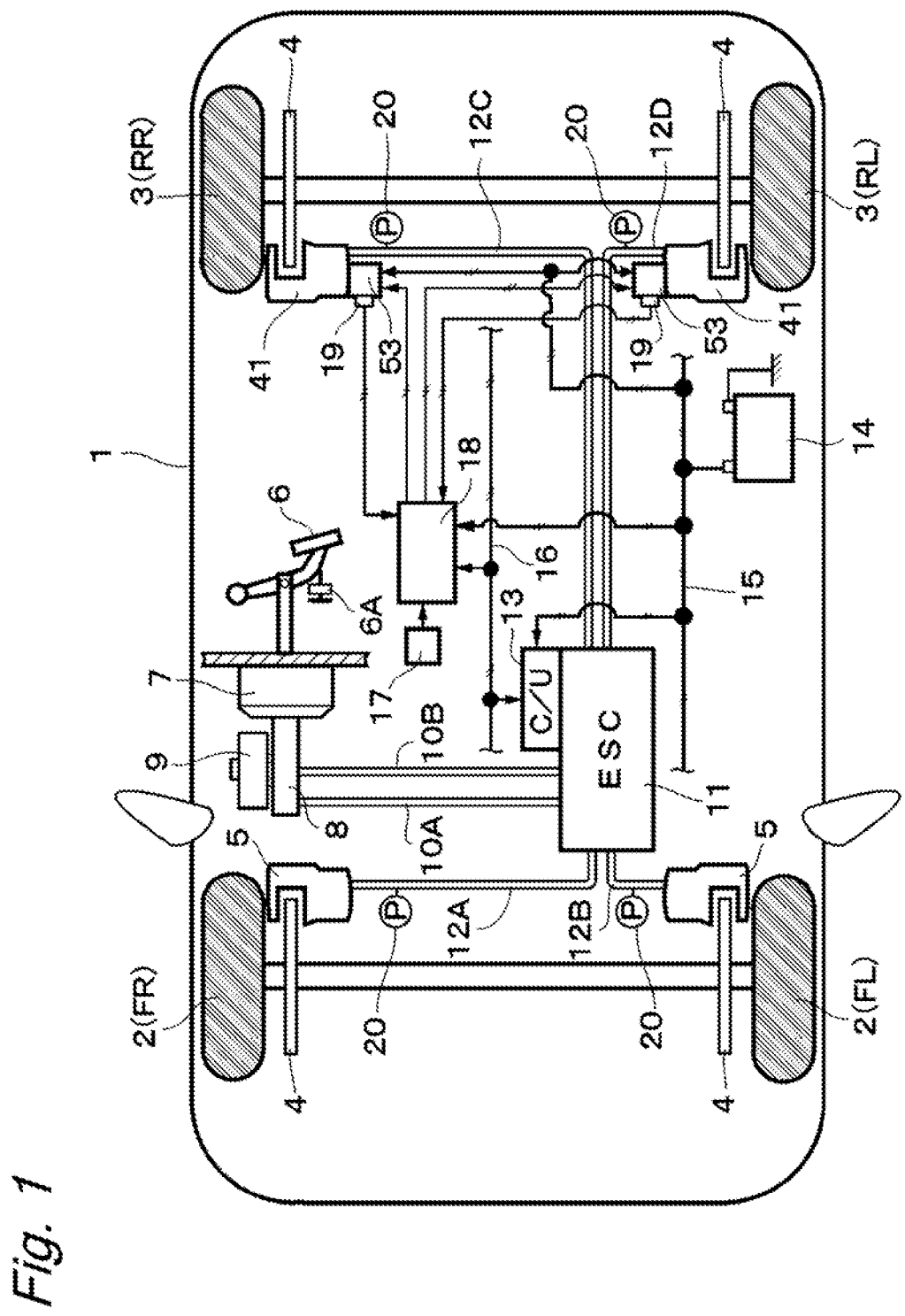
FIG. 1 illustrates a configuration of a brake system of a four-wheeled automobile including a brake apparatus according to a first embodiment of the present invention.

Now, FIGS. 1 to 6 illustrate a first embodiment of the present invention. Referring to FIG. 1, for example, front left and right wheels 2 and rear left and right wheels 3 are provided on a bottom side (a road surface side) of a vehicle body 1, which constitutes a main structure of a vehicle. A disk rotor 4 is mounted on each of these front and rear wheels 2 and 3. The disk rotor 4 rotates integrally with each wheel. More specifically, at each of the front wheels 2, each disk rotor 4 is sandwiched by a hydraulic disk brake 5. At each of the rear wheels 3, each disk rotor 4 is sandwiched by a disk brake 41 equipped with an electric parking brake, which will be described below. This configuration allows a braking force to be applied to each wheel (each of the front wheels 2 and each of the rear wheels 3).

A brake pedal 6 is disposed on a front board side of the vehicle body 1. The brake pedal 6 is operated by being pressed by a driver when a braking operation is performed on the vehicle. A pedal switch 6A is disposed on the brake pedal 6. This pedal switch 6A detects a pressing operation performed on the brake pedal 6, and outputs a signal indicating this detection to a control unit 13, which will be described below.

The pressing operation performed on the brake pedal 6 is transmitted to a master cylinder 8 via a booster apparatus 7. The booster apparatus 7 is constituted by a negative pressure booster or the like disposed between the brake pedal 6 and the master cylinder 8, and transmits a pressing force when the brake pedal 6 is operated by being pressed to the master cylinder 8 while boosting this force. At this time, the master cylinder 8 generates a hydraulic pressure with the aid of brake fluid supplied from a master reservoir 9. The master reservoir 9 constitutes a hydraulic fluid tank that contains the brake fluid.

The hydraulic pressure generated in the master cylinder 8 is transmitted to a hydraulic supply apparatus 11 (hereinafter referred to as an ESC 11) via, for example, a pair of cylinder-side hydraulic pipes 10A and 10B as a pipe line. This ESC 11 distributes and supplies the hydraulic pressure transmitted from the master cylinder 8 to the respective disk brakes 5 and 41 via brake-side pipe portions 12A, 12B, 12C, and 12D as the pipe line. As a result, a braking force is applied to each wheel (each of the front wheels 2 and each of the rear wheels 3) as described above. The ESC 11 includes, for example, respective control valves 24, 24', 26, 26', 28, 28', 32, 32', 33, and 33', an electric motor 35 that drives hydraulic pumps 34 and 34', and open/close valves 40 and 40', which will be described below.

The ESC 11 includes the hydraulic supply apparatus controller 13 (hereinafter referred to as a control unit 13) as a controller that controls an operation of the ESC 11. This control unit 13 drives and controls the respective control valves 24, 26, 28, 32, and 33, the electric motor 35, and the like of the ESC 11, which will be described below, thereby controlling brake hydraulic pressures to be supplied from the brake-side pipe portions 12A to 12D to the respective disk brakes 5 and 41 so as to increase, reduce, or maintain them. Controlling the brake hydraulic pressures in this manner can realize execution of brake control such as boosting control, braking force distribution control, brake assist control, anti-skid control, traction control, vehicle stability control including skid prevention, and hill start assist control.

The control unit 13 is constituted by a microcomputer or the like, and power is supplied from a battery 14 to the control unit 13 via a power source line 15. As illustrated in FIG. 1, an input side of the control unit 13 is connected to a vehicle data bus 16 and the like, and an output side of the control unit 13 is connected to the ESC 11 via the power source line 15 and the vehicle data bus 16.

Figure 2:
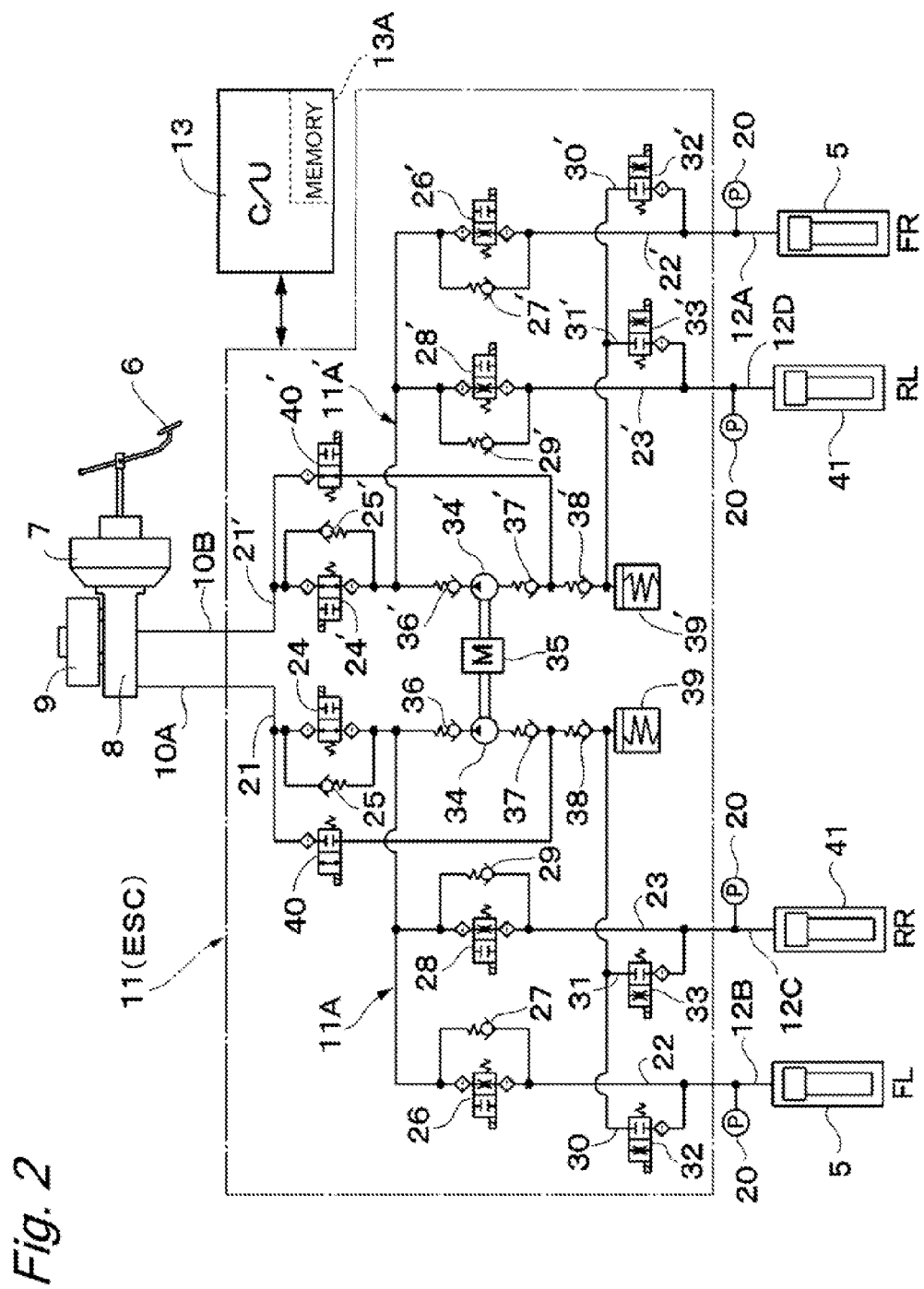
FIG. 2 illustrates a configuration of a circuit of a hydraulic supply apparatus that supplies a brake hydraulic pressure to a disk brake on each wheel side.

As illustrated in FIG. 2, the control unit 13 includes a storage unit 13A embodied by, for example, a flash memory, a ROM, or a RAM. This storage unit 13A stores, for example, a processing program for use in control processing when the parking brake is released illustrated in FIG. 4, which will be described below. In other word, the control unit 13 performs control for temporarily increasing the hydraulic pressure at the disk brake 41 on each of the rear wheels 3 (more specifically, processing as a pressure increase controller indicated by steps 3 to 5 illustrated in FIG. 4) when the parking brake is released (when braking by the parking brake is stopped) according to the processing program illustrated in FIG. 4.

The vehicle data bus 16 includes a CAN as a serial communication unit mounted on the vehicle body 1, and performs in-vehicle multiplex communication among a large number of electric devices mounted on the vehicle, the control unit 13, a parking brake control apparatus 18 that will be described below, and the like. In this case, examples of vehicle driving information transmitted to the vehicle data bus 16 include information such as detection signals from a steering angle sensor, an accelerator sensor, a brake sensor, a vehicle wheel speed sensor, and an inclination sensor (all of them are not illustrated). Further, this information includes detection signals (information) from, for example, pressure sensors 20, which will be described below.

A parking brake switch 17 is disposed at the vehicle body 1 so as to be located near a driver's seat (not illustrated), and this parking brake switch 17 is operated by the driver. When the parking brake switch 17 is operated, the parking brake control apparatus 18, which will be described below, outputs a control signal to the disk brake 41 (thus, an electric motor 53, which will be described below) on each of the rear wheels 3. As a result, the disk brake 41 on each of the rear wheels 3 starts to operate as the parking brake. To release the operation as the parking brake, the parking brake switch 17 is operated to a braking release side. According to this operation, the parking brake control apparatus 18 outputs a control signal for causing the electric motor 53, which will be described below, to rotate in a reverse direction, to the disk brake 41.

The parking brake control apparatus 18 is constituted by, for example, a microcomputer, and power is supplied from the battery 14 to the parking brake control apparatus 18 via the power source line 15. The parking brake control apparatus 18 controls driving of the disk brake 41 (thus, the electric motor 53), which will be described below, thereby generating a braking force when the vehicle is parked or stopped. As illustrated in FIG. 1, an input side of the parking brake control apparatus 18 is connected to the parking brake switch 17, current sensors 19, and the like. An output side of the parking brake control apparatus 18 is connected to the electric motor 53 of the disk brake 41, and the like. The input side and the output side of the parking brake control apparatus 18 are connected to the control unit 13 of the ESC 11, and the like via the vehicle data bus 16.

When the parking brake switch 17 is operated by the driver of the vehicle, the parking brake control apparatus 18 drives the electric motor 53, which will be described below, based on a signal (an ON or OFF signal) output from the parking brake switch 17, thereby causing the disk brake 41 to operate as the parking brake. To stop braking by the parking brake (to release the parking brake), the parking brake control apparatus 18 outputs a control signal to the control unit 13 of the ESC 11. As a result, the control unit 13 performs pressure increase control processing (processes of steps 3 to 5 illustrated in FIG. 4) for temporarily increasing the hydraulic pressure in a cylinder portion 46 of the disk brake 41, which will be described below.

As illustrated in FIG. 1, the current sensors 19 are disposed at the disk brakes 41 on the rear wheels 3, respectively. Each of these current sensors 19 detects a current value supplied to the electric motor 53 via the power source line 15 based on a control signal output from the parking brake control apparatus 18, and outputs a signal indicating this detection so as to feed it back to the parking brake control apparatus 18. The parking brake control apparatus 18 can detect a stop of a rotation of the electric motor 53 by, for example, monitoring a stall current of the electric motor 53 with use of the electric sensor 19. The pressure sensors 20, which respectively independently detect pressures (hydraulic pressures) within the pipes, are provided at the brake-side pipe portions 12A, 128, 12C, and 12D disposed between the ESC 11 and the respective disk brakes 5 and 41.

Next, a specific configuration of the ESC 11, which is the hydraulic supply apparatus, will be described in detail with reference to FIG. 2. The ESC 11 includes two hydraulic circuits, i.e., a first hydraulic system 11A, which is connected to one output port (i.e., the cylinder-side hydraulic pipe 10A) of the master cylinder 8 and supplies the hydraulic pressure to the disk brake 5 on the front left wheel (FL) side and the disk brake 41 on the rear right wheel (PR) side, and a second hydraulic system 11A', which is connected to the other output port (i.e., the cylinder-side hydraulic pipe 10B) and supplies the hydraulic pressure to the disk brake 5 on the front right wheel (FR) side and the disk brake 41 on the rear left wheel (RL) side. The first hydraulic system 11A and the second hydraulic system 11A' are identically configured. Therefore, in the following description, only the first hydraulic system 11A' will be described, and elements of the second hydraulic system 11A' will not be described specifically while they will be identified by reference numerals of elements of the first hydraulic system 11A with a symbol ['] (single quotation mark) added thereto.

The ESC 11 includes a brake pipe line 21 connected to a distal end side of the cylinder-side hydraulic pipe 10A. The brake pipe line 21 is divided into two lines, i.e., a first pipe line portion 22 and a second pipe line portion 23, which are connected to the disk brakes 5 and 41, respectively. The brake pipe line 21, the first brake pipe line portion 22, and the second brake pipe line portion 23 constitute a pipe line that supplies the hydraulic pressures to the calipers (for example, the cylinder portions 46 of the calipers 44) of the disk brakes 5 and 41 together with the cylinder-side hydraulic pipes 10A and 108, and the brake-side pipe portions 12A, 12B, 12C, and 12D.

A master cylinder shutoff control valve 24 and a check valve 25 are disposed in the brake pipe line 21 in parallel with each other. The master cylinder shutoff control valve 24 is constituted by a normally-opened electromagnetic switching valve that opens and closes the brake pipe line 21, and corresponds to a valve unit disposed in the pipe line. The check valve 25 allows a flow of the brake fluid from the master cylinder 8 into the brake pipe line 21 while preventing a flow in a reverse direction.

A pressure increase control valve 26 and a check valve 27 are disposed in the first pipe line portion 22 in parallel with each other. The pressure increase control valve 26 is constituted by a normally-opened electromagnetic switching valve that opens and closes the first pipe line portion 22. The check valve 27 allows a flow of the brake fluid from the disk brake 5 into the first pipe line portion 22 while preventing a flow in a reverse direction. A pressure increase control valve 28 and a check valve 29 are disposed in the second pipe line portion 23 in parallel with each other. The pressure increase control valve 28 is constituted by a normally-opened electromagnetic switching valve that opens and closes the second pipe line portion 23. The check valve 29 allows a flow of the brake fluid from the disk brake 41 into the second pipe line portion 23 while preventing a flow in a reverse direction.

When the brake pedal 6 is returned by the driver with both the pressure increase control valves 26 and 28 closed (shut off) especially during the anti-skid control, the check valves 27 and 29 allow the hydraulic pressures at the disk brakes 5 and 41 (i.e., the brake hydraulic pressures for generating braking forces) to be reduced according to this return operation, thereby functioning as safety valves.

The ESC 11 includes a first pressure reduction pipe line 30 and a second pressure reduction pipe line 31 that connect the disk brakes 5 and 41 and an ABS control reservoir 39, respectively. Pressure reduction control valves 32 and 33 are disposed in these first and second pressure reduction pipe lines 30 and 31, respectively. The pressure reduction control valves 32 and 33 are normally-closed electromagnetic switching valves that open and close the first and second pressure reduction pipe lines 30 and 31, respectively.

The ESC 11 includes the hydraulic pump 34 as a hydraulic source, and the hydraulic pump 34 is rotationally driven by the electric motor 35. The electric motor 35 is driven by power supply from the control unit 13, and stops rotating together with the hydraulic pump 34 upon a stop of the power supply. A discharge side of the hydraulic pump 34 is connected to the brake pipe line 21 on a downstream side of the master cylinder shutoff control valve 24 and the check valve 25 via the check valve 36. A suction side of the hydraulic pump 34 is connected to the ABS control reservoir 39 via check valves 37 and 38.

The ABS control reservoir 39 is provided for temporarily storing excessive brake fluid flowing out from the cylinders (for example, the insides of the cylinder portions 46, which will be described below) of the disk brakes 5 and 41 not only during the ABS control but also during other brake control than the ABS control. The suction side of the hydraulic pump 34 is connected to the cylinder-side hydraulic pipe 10A of the master cylinder 8 (i.e., the brake pipe line 21 on an upstream side of the master cylinder shutoff control valve 24 and the check valve 25) via the check valve 37 and the open/close valve 40, which is a normally-closed electromagnetic switching valve.

Due to this configuration, the ESC 11 directly supplies the hydraulic pressure generated in the master cylinder 8 during a normal operation based on a driver's braking operation to the disk brakes 5 and 41 via the brake pipe line 21 and the first and second pipe line portions 22 and 23. For example, to execute the anti-skid control or the like, the ESC 11 closes the pressure increase control valves 26 and 28 to maintain the hydraulic pressures in the disk brakes 5 and 41. To reduce the hydraulic pressures in the disk brakes 5 and 41, the ESC 11 opens the pressure reduction control valves 32 and 33 to discharge the hydraulic pressures in the disk brakes 5 and 41 so as to release them to the ABS control reservoir 39.

The above-described respective control valves 24, 24', 26, 26', 28, 28', 32, 32', 33, and 33', the electric motor 35 that drives the hydraulic pumps 34 and 34', and the open/close valves 40 and 40' are connected to the output side of the control unit 13. An operation of each of them is controlled by a predetermined procedure according to a control signal output from the control unit 13.

For example, to increase the hydraulic pressures to be supplied to the disk brakes 5 and 41 to perform, for example, the stability control (the skid prevention control) when the vehicle is running, the hydraulic pump 34 is actuated by the electric motor 35 with the master cylinder shutoff valve 24 closed, and a hydraulic pressure generated by the hydraulic pump 34 is supplied to the disk brakes 5 and 41 via the first and second pipe line portions 22 and 23. At this time, the open/close valve 40 is opened as necessary, allowing the brake fluid in the master reservoir 9 to be supplied from the master cylinder 8 toward the suction side of the hydraulic pump 34.

At this time, the control unit 13 controls operations of the master cylinder shutoff control valve 24, the pressure increase control valves 26 and 28, the pressure reduction control valves 32 and 33, the open/close valve 40, and the electric motor 35 (thus, the hydraulic pump 34) based on the above-described vehicle driving information via the vehicle data bus 16, thereby appropriately maintaining, reducing, or increasing the hydraulic pressures to be supplied to the disk brakes 5 and 41. This pressure control can realize execution of the brake control such as the boosting control, the braking force distribution control, the brake assist control, the anti-skid control, the traction control, the vehicle stability control, and the hill start assist control.

Next, a configuration of the disk brake 41 equipped with the electric parking brake, which is mounted on each of the rear wheels 3, will be described with reference to FIG. 3.

The disk brake 41 as the brake apparatus used in the present embodiment is configured as a hydraulic disk brake equipped with an electric parking brake. The disk brake 41 includes a mount member 42 mounted on a non-rotatable portion of the rear wheel side of the vehicle, inner-side and outer-side brake pads 43, and a caliper 44 containing the electric motor 53, which will be described below.

The mount member 42 includes a pair of arm portions (not illustrated) extending in an axial direction of the disk rotor 4 (i.e., a disk axial direction) over an outer circumference of the disk rotor 4 and spaced apart from each other in a disk circumferential direction, a thick support portion 42A disposed so as to integrally connect proximal end sides of the respective arm portions with each other and fixed to the non-rotatable portion of the vehicle at a position on an inner side of the disk rotor 4, and the like. A reinforcement beam 42B is integrally formed at the mount member 42. The reinforcement beam 42B couples distal end sides of the respective arm portions with each other at a position on an outer side of the disk rotor 4.

According to this configuration, the respective arm portions of the mount member 42 are integrally coupled with each other through the support portion 42A on the inner side of the disk rotor 4, and are also integrally coupled with each other through the reinforcement beam 42B on the outer side of the disk rotor 4. The inner-side and outer-side brake pads 43 are supported by the respective arm portions of the mount member 42 so as to be movable in the disk axial direction, and are configured to be pressed against both surface sides of the disk rotor 4 by the caliper 44, which will be described below.

The caliper 44 is disposed at the mount member 42 so as to extend over the outer circumferential side of the disk rotor 4. The caliper 44 includes a caliper main body 45 supported so as to be movable along the axial direction of the disk rotor 4 relative to the respective arm portions of the mount member 42, a piston 49 and a rotation/linear motion conversion mechanism 50 disposed in the caliper main body 45, the electric motor 53, and the like. The piston 49 and the rotation/linear motion conversion mechanism 50 will be described below.

The caliper main body 45 includes the cylinder portion 46, a bridge portion 47, and a claw portion 48. The cylinder portion 46 is formed into a bottomed cylindrical shape having a closed end on one axial side thereof where a partition wall portion 46A is formed, and having an opening end on the other axial side thereof that faces the disk rotor 4. The bridge portion 47 is formed so as to extend over the outer circumferential side of the disk rotor 4 from the cylinder portion 46 in the disk axial direction. The claw portion 48 is arranged so as to extend on an opposite side of the bridge portion 47 from the cylinder portion 46. The cylinder portion 46 of the caliper main body 45 constitutes an inner leg portion disposed on one side (the inner side) of the disk rotor 4, and the claw portion 48 constitutes an outer leg portion disposed on the other side (the outer side) of the disk rotor 4.

The cylinder portion 46 of the caliper main body 45 corresponds to a hydraulic cylinder, which is a constituent feature of the present invention. The hydraulic pressure is supplied into the cylinder portion 46 via the brake-side pipe portion 12C or 12D illustrated in FIGS. 1 and 2 according to a pressing operation performed on the brake pedal 6 or the like. The partition wall portion 46A is integrally formed at the cylinder portion 46 at a position between the cylinder portion 46 and the electric motor 53, which will be described below. An output shaft 53B of the electric motor 53, which will be described below, is rotatably inserted on an inner circumferential side of the partition wall portion 46A. The piston 49, the rotation/linear motion conversion mechanism 50, which will be described below, and the like are disposed in the cylinder portion 46 of the caliper main body 45.

The piston 49 has an opening on one axial side, and this opening side is inserted in the cylinder portion 46. The other axial side of the piston 49 faces the inner-side brake pad 43, and is closed to form a cover portion 49A. The rotation/linear motion conversion mechanism 50 is contained within the piston 49 in the cylinder portion 46, and the piston 49 is configured to be thrust by the rotation/linear motion conversion mechanism 50 in an axial direction of the cylinder portion 46. The rotation/linear motion conversion mechanism 50 corresponds to a piston thrust mechanism, which is a constituent feature of the present invention, and serves to thrust the piston 49 by an external force (the electric motor 53) independently from the supply of the hydraulic pressure into the cylinder portion 46.

The rotation/linear motion conversion mechanism 50 includes a screw member 51 constituted by a rod-like body with a male screw such as a trapezoidal thread formed thereon, and a linearly movable member 52 with a female screw hole of a trapezoidal thread formed on an inner circumferential side thereof. In other words, the screw member 51 threadably engaged with the inner circumferential side of the linearly movable member 52 constitutes a screw mechanism for converting a rotational motion by the electric motor 53, which will be described below, into a linear motion of the linearly movable member 52. In this case, the female screw of the linearly movable member 52 and the male screw of the screw member 51 are formed with use of highly irreversible screws, in particular, trapezoidal threads in the present embodiment, thereby realizing a piston holding mechanism. This piston holding mechanism can hold the linearly movable member 52 (thus, the piston 49) at an arbitrary position with the aid of a frictional force (a holding force) even during a stop of power supplied to the electric motor 53, which will be described below, thereby achieving energy saving. The piston holding mechanism may be realized by another highly irreversible screw than the trapezoidal thread. Further, the piston holding mechanism may be realized independently from the rotation/linear motion conversion mechanism 50 by, for example, providing a worm gear between the electric motor 53 and the rotation/linear motion conversion mechanism 50 as a transmission mechanism for transmitting a rotation, or providing a latch mechanism for engaging a rotational member between the electric motor 53 and the rotation/linear motion conversion mechanism 50.

The screw member 51 disposed so as to be threadably engaged with the inner circumferential side of the linearly movable member 52 includes a flange portion 51A as a large-diameter flange on one axial side, and the other axial side of the linearly movable member 52 extends toward the cover portion 49A of the piston 49. The screw member 51 is integrally coupled to the output shaft 53B of the electric motor 53, which will be described below, on the one side thereof where the flange portion 51A is formed. An engagement protrusion 52A is formed on an outer circumferential side of the linearly movable member 52. The engagement protrusion 52A prohibits the linearly movable member 52 from rotating relative to the piston 49 (prohibits a relative rotation) while allowing the linearly movable member 52 to axially move relative to the piston 49.

The electric motor 53 as a parking brake actuator is disposed in a motor case 53A. The motor case 53A is disposed so as to be fixed to the cylinder portion 46 of the caliper main body 45 at a position outside the partition wall portion 46A. The electric motor 53 contains, for example, a stator and a rotor (both of them are not illustrated), and includes the output shaft 53B rotatable integrally with the rotor. The output shaft 53B axially extends through the partition wall portion 46A of the cylinder portion 46, and is coupled to the one side of the screw portion 51 where the flange portion 51A is formed so as to be rotatable integrally therewith in the cylinder portion 46.

Figure 3:
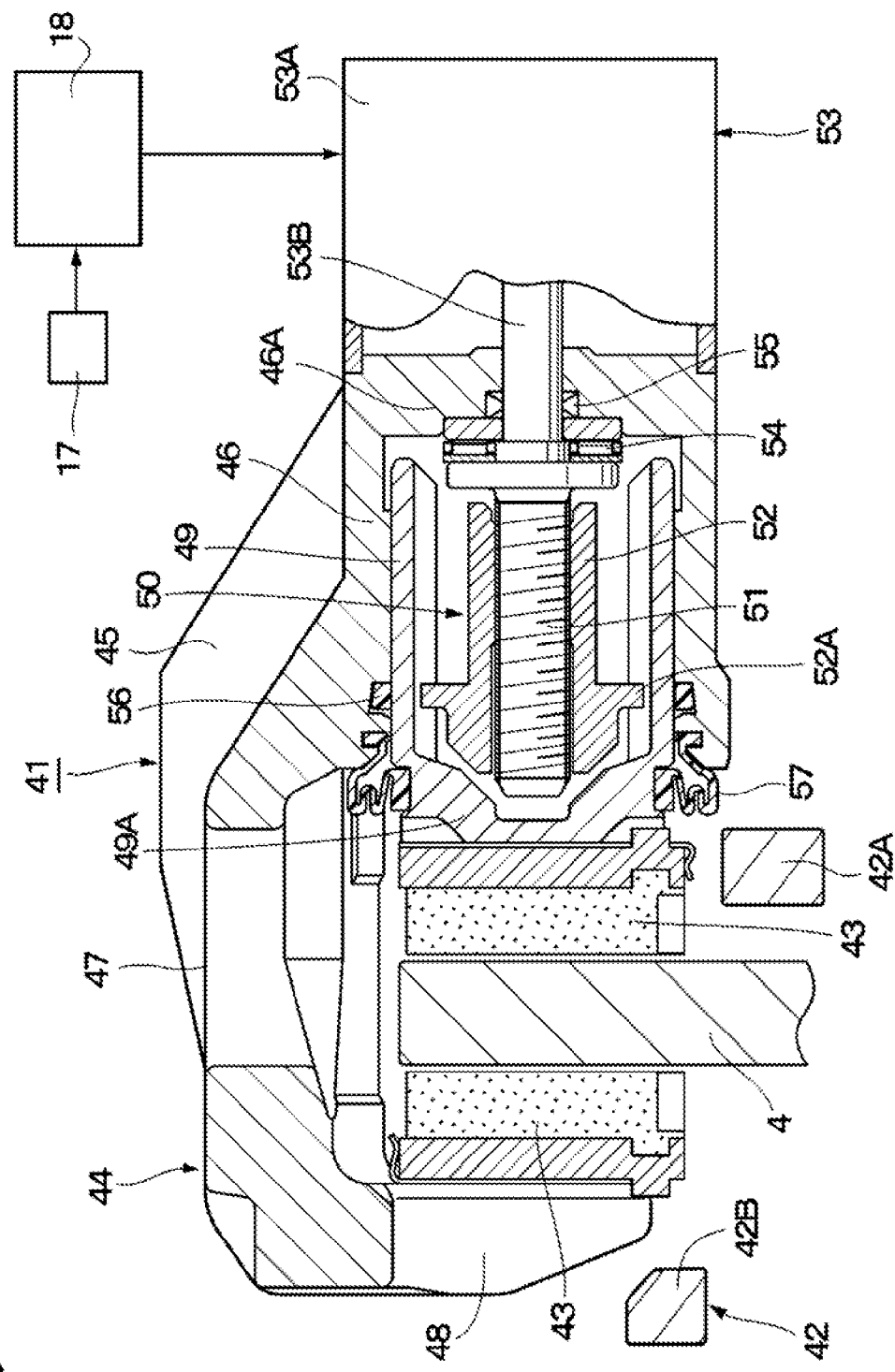
FIG. 3 is an enlarged vertical cross-sectional view illustrating a disk brake equipped with an electric parking brake, which is mounted on each rear wheel side illustrated in FIG. 1.

For example, when the parking brake switch 17 illustrated in FIGS. 1 and 3 is operated by the driver, power is supplied to the electric motor 53 via the power source line 15 based on a control signal output from the parking brake control apparatus 18, thereby rotating the output shaft 53B of the electric motor 53. Therefore, the screw member 51 is rotated integrally with the output shaft 53B in, for example, one direction, and thrusts (drives) the piston 49 toward the disk rotor 4 through the linearly movable member 52 of the rotation/linear motion conversion mechanism 50. As a result, the disk brake 41 sandwiches the disk rotor 4 between the inner-side and outer-side brake pads 43, thereby being operated (applied) as the electric parking brake.

On the other hand, when the parking brake switch 17 is operated toward the braking release side, the screw member 51 is rotationally driven by the electric motor 53 in the other direction (the reverse direction). As a result, the linearly movable member 52 of the rotation/linear motion conversion mechanism 50 is driven in a retracing direction away from the disk rotor 4, whereby the disk brake 41 is dismissed (released) from the operation as the parking brake.

More specifically, in the rotation/linear motion conversion mechanism 50, a relative rotation of the screw member 51 relative to the linearly movable member 52 causes the linearly movable member 52 to axially relatively move according to a rotational angle of the screw member 51 because the linearly movable member 52 is prohibited from being rotated in the piston 49. In this manner, the rotation/linear motion conversion mechanism 50 converts a rotational motion into a linear motion. In the present embodiment, the rotation/linear motion conversion mechanism 50 is embodied by the screw mechanism, but may be embodied by another rotation/linear motion conversion mechanism such as a ball screw mechanism, a ball ramp mechanism, a roller ramp mechanism, or a precision roller screw mechanism. In the present embodiment, the rotation/linear motion conversion mechanism 50 is configured in such a manner that the rotation/linear motion conversion mechanism 50 is contained within the piston 49, but the rotation/linear motion conversion mechanism 50 does not have to be contained within the piston 49 as long as the piston 49 can be thrust by the rotation/linear motion conversion mechanism 50.

A thrust bearing 54 is disposed on the partition wall portion 46A of the cylinder portion 46 between the partition wall portion 46A and the flange portion 51A of the screw member 51. This thrust bearing 54 serves to receive a thrust load from the screw member 51 together with the partition wall portion 46A, and facilitate a smooth rotation of the screw member 51 relative to the partition wall portion 46A. A seal member 55 is disposed on the partition wall portion 46A of the cylinder portion 46 between the partition wall portion 46A and the output shaft 53B of the electric motor 53. The seal member 55 seals between the partition wall portion 46A and the output shaft 53B so as to prevent the brake fluid in the cylinder portion 46 from leaking toward the electric motor 53.

A piston seal 56 as an elastic seal for sealing between the cylinder portion 46 and the piston 49, and a dust boot 57 for preventing a foreign object from entering into the cylinder portion 46 are disposed on the opening end side of the cylinder portion 46. The dust boot 57 is constituted by a flexible bellows-like seal member, and is attached between the opening end of the cylinder portion 46 and an outer circumference of the other axial side of the cylinder portion 46 where the cover portion 49A is formed.

As illustrated in FIG. 5(A), when a hydraulic pressure P is supplied into the cylinder portion 46 to push and move the piston 49, the piston seal 56 as the elastic seal is elastically deformed in such a manner that an inner circumferential side of the piston seal 56 is bent by this hydraulic pressure in a direction of the movement of the piston 49. On the other hand, as illustrated in FIG. 5(B), when the hydraulic pressure is being released to return the piston 49 into the cylinder portion 46, the piston seal 56 exerts an elastic restoring force to provide a rollback function, thereby succeeding in returning the piston 49 to a desired position (a normal braking release position).

The disk brake 5 on each of the front wheels 2 is configured in a substantially similar manner to the disk brake 41 on each of the rear wheels 3 except for the parking brake mechanism. More specifically, the disk brake 5 on each of the front wheels 2 does not include the rotation/linear motion conversion mechanism 50 (the screw member 51 and the linearly movable member 52) that operates as the parking brake, the electric motor 53, and the like, unlike the disk brake 41 on each of the rear wheels 3. However, except for that, the disk brake 5 on each of the front wheels 2 and the disk brake 41 on each of the rear wheels 3 are substantially similarly configured. Alternatively, in some cases, the present embodiment may be configured in such a manner that the disk brake 41 equipped with the electric parking brake is also mounted on each of the front wheels 2, instead of the disk brake 5.

The brake apparatus (the disk brake 41 equipped with the electric parking brake) of the four-wheeled automobile according to the first embodiment is configured in the above-described manner, and an operation thereof will be described next.

When the brake pedal 6 is operated by being pressed by the driver of the vehicle, this pressing force is transmitted to the master cylinder 8 via the booster apparatus 7, and a brake hydraulic pressure is generated by the master cylinder 8. The hydraulic pressure generated by the master cylinder 8 is distributed and supplied to the respective disk brakes 5 and 41 via the cylinder-side hydraulic pipes 10A and 10B, the ESC 11, and the brake-side pipe portions 12A, 12B, 12C, and 12D, thereby applying braking forces onto the respective front left and right wheels 2 and the respective rear left and right wheels 3.

At this time, the disk brake 41 on each of the rear wheels 3 operates in the following manner. The hydraulic pressure is supplied into the cylinder portion 46 of the caliper 44 via the brake-side pipe portion 12C or 12D, and the piston 49 is slidably displaced toward the inner-side brake pad 43 according to an increase in the hydraulic pressure in the cylinder portion 46. As a result, the piston 49 presses the inner-side brake pad 43 against one side surface of the disk rotor 4. A reaction force at this time causes the whole caliper 44 to be slidably displaced toward the inner side of the disk rotor 4 relative to the respective arm portions of the mount member 42.

As a result, the outer leg portion (the claw portion 48) of the caliper 44 moves so as to press the outer-side brake pad 43 against the disk rotor 4. The disk rotor 4 is sandwiched from axial both sides by the pair of brake pads 43, whereby a braking force is generated according to the supply of the hydraulic pressure. On the other hand, when the braking operation is released, the supply of the hydraulic pressure into the cylinder portion 46 is released and stopped, whereby the piston 49 is displaced so as to retract into the cylinder portion 46. Then, the inner-side and outer-side brake pads 43 are separated from the disk rotor 4, whereby the vehicle is returned into a non-braked state.

At this time, as illustrated in FIGS. 5(A) and (B), the piston seal 56, which seals between the cylinder portion 46 and the piston 49, exerts the rollback function due to the elastic restoring force when the hydraulic pressure P is being released to return the piston 49 into the cylinder portion 46 as described above. As a result, the piston seal 56 can return the piston 49 to the desired braking release position to secure a space for separating the brake pad 43 from the disk rotor 4 rotating when the vehicle is running, thereby preventing occurrence of a so-called pad drag phenomenon.

On the other hand, when the parking brake switch 17 is operated by the driver of the vehicle for a start of an operation of the parking brake, power is supplied to the electric motor 53 of the disk brake 41 via the power source line 15 according to a control signal from the parking brake control apparatus 18, whereby the output shaft 53B of the electric motor 53 is rotationally driven. The disk brake 41 equipped with the electric parking brake converts the rotation of the electric motor 53 into a linear motion through the screw member 51 and the linearly movable member 52 of the rotation/linear motion conversion mechanism 50 to axially move the linearly movable member 52 to thrust the piston 49, thereby pressing the pair of brake pads 43 against the both surfaces of the disk rotor 4.

At this time, the linearly movable member 52 is maintained in a braking state with the aid of a frictional force generated between the linearly movable member 52 and the screw member 51, whereby the disk brake 41 on each of the rear wheels 3 is actuated as the parking brake. In other words, even after a stop of the power supply to the electric motor 53, the linearly movable member 52 (thus, the piston 49) can be held at the braking position by the piston holding mechanism constituted by the female screw of the linearly movable member 52 and the male screw of the screw member 51.

Next, when the parking brake switch 17 is operated toward the braking release side by the driver of the vehicle for a release of the parking brake, the parking brake control apparatus 18 outputs a control signal for a reverse rotation of the motor to the electric motor 53. Then, the output shaft 53B of the electric motor 53 is rotated in a reverse direction from a direction at the time of application of the parking brake. At this time, the rotation/linear motion conversion mechanism 50 releases holding of the braking force by the screw member 51 and the linearly movable member 52, and moves the linearly movable member 52 into the cylinder portion 46 in a return direction by a movement amount corresponding to the reverse rotation of the electric motor 53 together with the piston 49, thereby releasing the braking force of the parking brake (the disk brake 41).

The disk brake 41 equipped with the electric parking brake is configured to be actuated by converting a rotational motion of the electric motor 53 into a linear motion of the piston 49 through the rotation/linear motion conversion mechanism 50 without receiving external supply of a hydraulic pressure. Therefore, when the disk brake 41 operates as the parking brake in this manner, the piston seal 56 is elastically deformed by a relatively small amount compared to elastic deformation when a hydraulic pressure is supplied, because no hydraulic pressure is externally applied to the piston seal 56 disposed between the cylinder portion 46 of the caliper 44 and the piston 49. Accordingly, when the parking brake is released, the elastic deformation amount of the piston seal 56 may be insufficient to acquire the rollback function enough, leading to a failure to return the piston 49 to the normal braking release position by the piston seal 56.

Therefore, the first embodiment is configured to cause the control unit 13 to perform control processing when the parking brake is released. More specifically, the control unit 13 performs control for temporarily increasing the brake hydraulic pressure at the disk brake 41 on each of the rear wheels 3 when the parking brake is released (when braking by the parking brake is stopped), according to the processing program illustrated in FIG. 4. In this case, processes of steps 3 to 5 illustrated in FIG. 4 correspond to the pressure increase controller, which is a constituent feature of the present invention.

Figure 4:
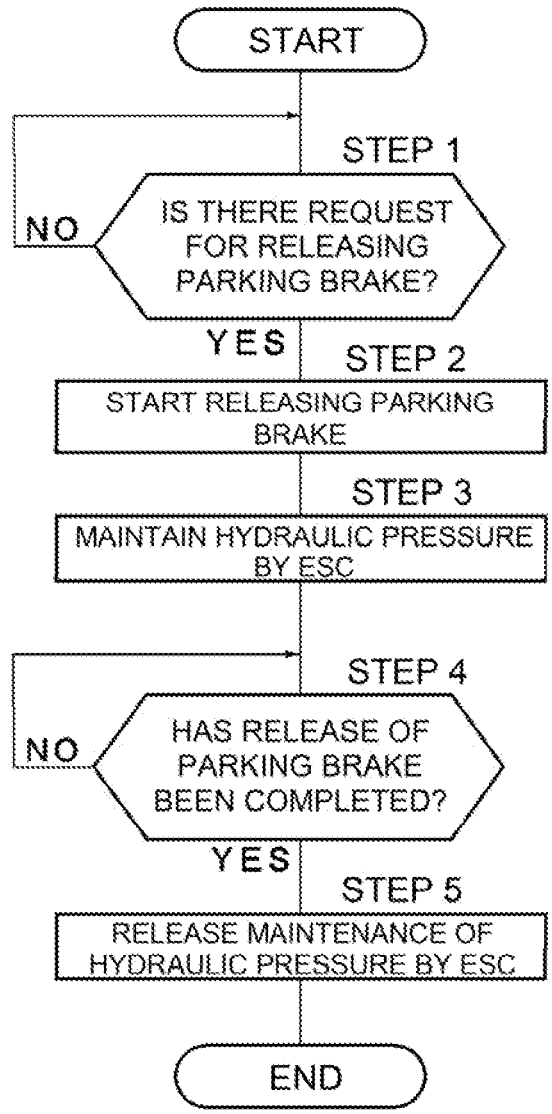
FIG. 4 is a flowchart illustrating control processing when the parking brake is released according to the first embodiment.

Upon a start of the processing operation illustrated in FIG. 4, in step 1, it is determined whether the parking brake switch 17 is operated to the braking release side, i.e., whether a request for releasing the parking brake is issued. If "NO" is determined in step 1, this means that a release request is not issued. Therefore, while this state is maintained, the piston 49 is kept held at the braking position together with the linearly movable member 52 with use of the piston holding mechanism, and the determination process of step 1 is repeated.

On the other hand, if "YES" is determined in step 1, this means that the parking brake switch 17 is operated to the braking release side, and a release request is issued. Therefore, in a subsequent step, step 2, the parking brake control apparatus 18 starts releasing the parking brake to cause the electric motor 53 (the output shaft 53B) of the disk brake 41 to rotate in the reverse direction from the direction at the time of application of the parking brake. More specifically, a thrust force F applied on the piston 49 of the disk brake 41 by the rotation/linear motion conversion mechanism 50 is in a highly braking state during, for example, a time period from time 0 to time T1 as indicated by a characteristic line 58 drawn by a solid line in FIG. 6. This thrust force F is gradually reducing after time T1, and reaches a zero level at, for example, time T3 to release the braking force.

In this case, the release request is issued by the operation of the parking brake switch 17 at time Tr before time T1, and holding of the piston 49 starts being released at this time. However, the thrust force F applied on the piston 49 starts reducing around time T1 with a slight time lag. In this manner, at a time (for example, time T2 illustrated in FIG. 6) during the reduction of the thrust force F applied on the piston 49 from the start of the release of the parking brake, the control unit 13 performs hydraulic maintaining control by the ESC 11 in step 3 illustrated in FIG. 4.

More specifically, the control unit 13 switches the master cylinder shutoff control valves 24 and 24' illustrated in FIG. 2 from valve open positions to valve close positions, thereby shutting off the first pipe line portions 22 and 22' and the second pipe line portions 23 and 23' of the brake pipe lines 21 and 21' to the cylinder-side hydraulic pipes 10A and 10B. As a result, the disk brake 41 on each of the rear wheels 3 (RR and RL) is placed into such a state that the hydraulic pressure P is held in the cylinder portion 46. At this time, the piston 49 is moving in the retracting direction according to the reverse rotation of the electric motor 53 in the cylinder portion 46 of the disk brake 41, whereby the hydraulic pressure P in the cylinder portion 46 is gradually increasing according to the retraction of the piston 49. In other words, the piston 49 is moving into the cylinder portion 46 according to the reverse rotation of the electric motor 53 to reduce a volume of the hydraulic chamber in the cylinder portion 46, thereby resulting in an increase in the hydraulic pressure P in the cylinder portion 46 by an amount corresponding to this volume reduction. It should be noted here that the hydraulic pressure means is maintained in such a state that the brake fluid in the cylinder portion 46 is unable to leak out of the cylinder portion 46, i.e., a state in which the amount of the brake fluid in the cylinder portion 46 and the brake-side pipe portions 12A and 12C is maintained.

Figure 5:
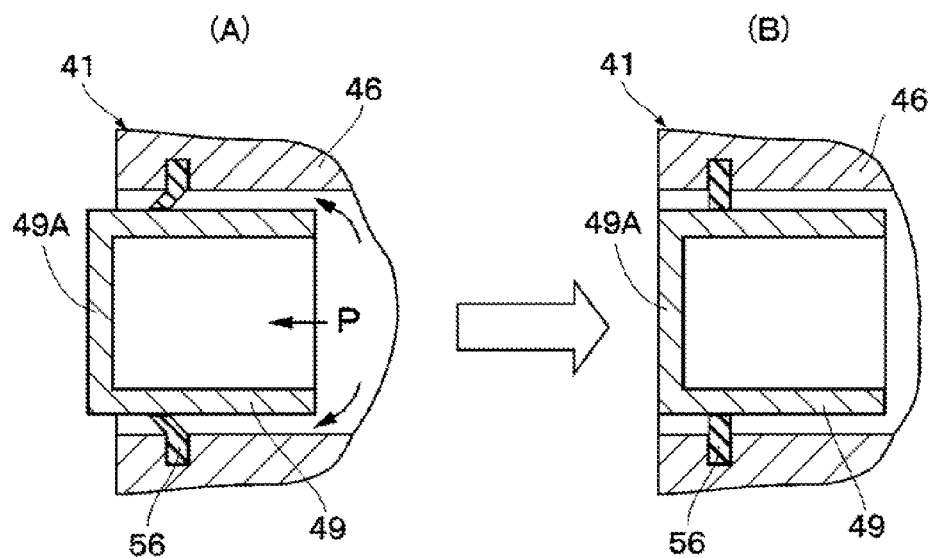
FIGS. 5(A) and 5(B) are cross-sectional views illustrating a rollback operation of a piston seal.
Figure 6:
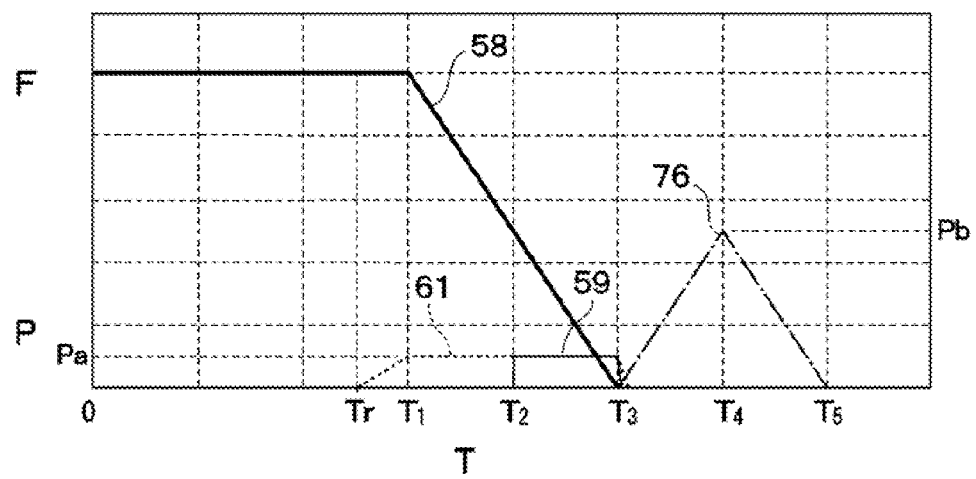
FIG. 6 illustrates characteristic lines that represent control characteristics of a thrust force F and a hydraulic pressure P when the parking brake is released.

More specifically, a hydraulic pressure is generated in the cylinder portion 46 of the disk brake 41 after, for example, time T2, as indicated by a characteristic line 59 drawn by a solid line in FIG. 6, and this hydraulic pressure is maintained until the operation of the parking brake is released at, for example, time T3. Therefore, as illustrated in FIG. 5(A), the piston seal 56 disposed between the cylinder portion 46 and the piston 49 of the disk brake 41 is elastically deformed in such a manner that the inner circumferential side thereof is bent according to the increase and addition of the hydraulic pressure P. In other words, the piston seal 56 can be largely elastically deformed in a similar manner to elastic deformation at the time of supply of a hydraulic pressure by an operation of the brake pedal 6.

In a subsequent step, step 4, the control unit 13 determines whether the release of the parking brake has been completed, i.e., whether the piston 49 of the disk brake 41 has moved in the retracting direction to reach the predetermined braking release position according to the reverse rotation of the electric motor 53 through the rotation/linear motion conversion mechanism 50. If the control unit 13 determines "NO" in step 4, this means that the release of the parking brake has not been completed yet. Therefore, while this state is maintained, the control unit 13 waits until the piston 49 retracts to the braking release position. In other words, the control unit 13 continues the hydraulic maintaining control by the ESC 11 until the operation of the parking brake is released at, for example, time T3 illustrated in FIG. 6.

Subsequently, if the control unit 13 determines "YES" in step 4, this means that the operation as the parking brake is released. Therefore, the processing proceeds to step 5, in which the control unit 13 release the maintenance of the hydraulic pressure by the ESC 11. More specifically, the control unit 13 causes the master cylinder shutoff control valves 24 and 24' illustrated in FIG. 2 to return from the valve close positions to the valve open positions, thereby establishing communication between the first pipe line portions 22 and 22' and the second pipe line portions 23 and 23' of the brake pipe lines 21 and 21' and the cylinder-side hydraulic pipes 10A and 10B. This triggers an immediate reduction of the hydraulic pressure P in the cylinder portion 46 at the disk brake 41 on each of the rear wheels 3 (RR and RL).

Therefore, as illustrated in FIG. 5(B), the piston seal 56 of the disk brake 41 can exert the rollback function with the aid of its elastic restoring force, thereby succeeding in returning the piston 49 to the normal braking release position. Accordingly, when the parking brake is released, the piston 49 can be returned to the desired position by the piston seal 56, whereby it is possible to prevent occurrence of a drag of the brake pad 43 or the like.

If the brake pedal 6 is operated by being pressed during execution of the processing as the pressure increase controller according to steps 3 to 5 illustrated in FIG. 4, the control unit 13 interrupts the hydraulic maintaining control by the ESC 11 according to a detection signal from the pedal switch 6A, thereby canceling the increase in the hydraulic pressure in the cylinder portion 46. This cancel allows the disk brakes 5 on the front wheels 2 and the disk brakes 41 on the rear wheels 3 to provide braking forces according to the pressing operation performed on the brake pedal 6.

In this manner, according to the first embodiment, after a start of a release for ending a braking state of the parking brake in the process of step 2 illustrated in FIG. 4, the hydraulic maintaining control is performed by the ESC 11 in the subsequent step, step 3. This control allows the hydraulic pressure in the cylinder portion 46 (the hydraulic cylinder) to temporarily increase according to the retraction of the piston 49 of the disk brake 41, thereby realizing the pressure increase controller, which is a constituent feature of the present invention, by the processes of steps 3 to 5.

Therefore, according to the first embodiment, at the time of a release of holding of a braking force by the screw member 51 and the linearly movable member 52 (i.e., at a start of a release of the parking brake), the hydraulic pressure in the cylinder portion 46 of the disk brake 41 temporarily increases to achieve a large elastic deformation amount of the piston seal 56 to thereby succeed in acquiring the rollback function enough to return the piston 49 to the normal braking release position. As a result, it is possible to secure a space for separating the brake pad 43 from the disk rotor 4 rotating when the vehicle is running, thereby preventing occurrence of a pad drag phenomenon or the like.

The first embodiment has been described based on the example in which the hydraulic maintaining control by the ESC 11 is performed by switching the master cylinder shutoff control valves 24 and 24' illustrated in FIG. 2 from the valve open positions to the valve close positions. However, the present invention is not limited to this example, and may be configured to perform the hydraulic maintaining control by the ESC 11 by switching the pressure increase control valves 28 and 28' as the valve unit disposed in the pipe line from the valve open positions to the valve close positions.

Figure 7:
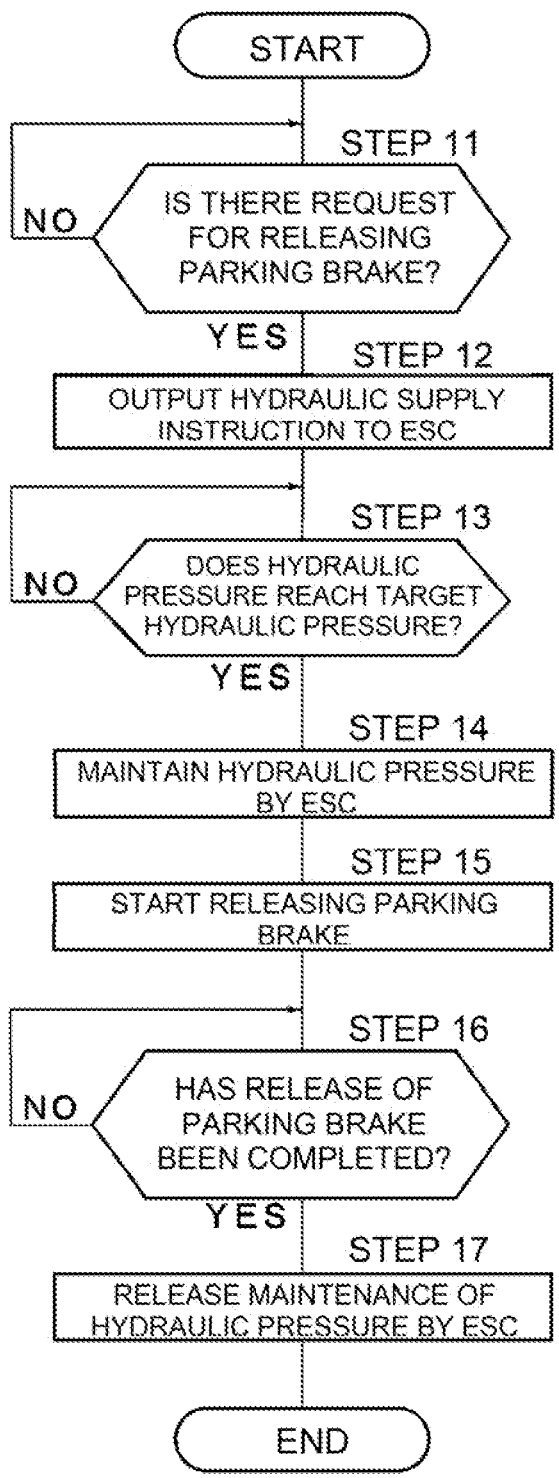
FIG. 7 is a flowchart illustrating control processing when the parking brake is released according to a second embodiment.

Next, FIG. 7 illustrates a second embodiment of the present invention. In the following description of the second embodiment, similar components to the above-described first embodiment will be identified by the same reference numerals as the first embodiment, and descriptions thereof will be omitted below. However, the second embodiment is characterized in that it is configured to employ the hydraulic supply apparatus (ESC) 11 that uses the hydraulic pumps 34 and 34' to be rotationally drive by the electric motor 35 illustrated in FIG. 2 as the hydraulic source, as a hydraulic generator capable of generating a hydraulic pressure even when no operation is performed on the brake pedal 6.

According to the second embodiment, the control unit 13 performs control for temporarily increasing the brake hydraulic pressure at the disk brake 41 on each of the rear wheels 3 when the parking brake is released (when braking is stopped) according to a processing program illustrated in FIG. 7. In this case, processes indicated in steps 12 to 17 illustrated in FIG. 7 correspond to the pressure increase controller, which is a constituent feature of the present invention.

More specifically, upon a start of the processing operation illustrated in FIG. 7, in step 11, it is determined whether the parking brake switch 17 is operated to the braking release side, i.e., whether a request for releasing the parking brake is issued. If "NO" is determined in step 11, this means that a release request is not issued. Therefore, while this state is maintained, the piston 49 is kept held at the braking position together with the linearly movable member 52 with use of the piston holding mechanism, and the determination process of step 11 is repeated.

On the other hand, if "YES" is determined in step 11, this means that the parking brake switch 17 is operated to the braking release side, and a release request is issued. Therefore, in a subsequent step, step 12, the control unit 13 outputs a hydraulic supply instruction to the ESC 11. More specifically, the control unit 13 controls the ESC 11 to switch the master cylinder shutoff control valves 24 and 24' illustrated in FIG. 2 from the vale open positions to the valve close positions and switch the open/close valves 40 and 40' from the valve close positions to the valve open positions, and rotationally drive the hydraulic pumps 34 and 34' with use of the electric motor 35.

The hydraulic pressure generated by the hydraulic pumps 34 and 34' of the ESC 11 without relying on an operation performed on the brake pedal 6 is supplied to the caliper sides of the respective disk brakes 5 and 41 via the first pipe line portions 22 and 22' and the second pipe line portions 23 and 23'. Therefore, the hydraulic pressure in the cylinder portion 46 increases at the disk brake 41 on each of the rear wheels 3 (RR and RL). In other words, when a release request is issued by an operation performed on the parking brake switch 17 at time Tr illustrated in FIG. 6, the control unit 13 outputs hydraulic supply instruction to the ESC 11 in the process of step 12, and the hydraulic pressure in each of the cylinder portions 46 increases as indicated 1 by a characteristic line 61 drawn by a dotted line from Tr to T2 illustrated in FIG. 6.

In a subsequent step, step 13, the control unit 13 detects the hydraulic pressure in each of the brake-side pipe portions 12C and 12D by the pressure sensor 20, and determines whether the detected hydraulic pressure reaches a predetermined target hydraulic pressure Pa. If the control unit 13 determines "NO" in step 13, this means that the hydraulic pressure in each of the cylinder portions 46 does not increase to the target hydraulic pressure Pa. Therefore, while this state is maintained, the control unit 13 continues supplying and adding the hydraulic pressure by the hydraulic pumps 34 and 34'. This hydraulic pressure Pa is set to a pressure lower than a pressure to generate a braking force (the thrust force F illustrated in FIG. 6) required when the parking brake is applied but necessary to elastically deform the piston seal 56 as illustrated in FIG. 5(A).

If the control unit 13 determines "YES" in step 13, and the hydraulic pressure in each of the cylinder portions 46 increases to the target hydraulic pressure Pa, the processing proceeds to a subsequent step, step 14, in which the control unit 13 performs the hydraulic maintaining control by the ESC 11. More specifically, the control unit 13 controls the ESC 11 to stop the hydraulic supply by the hydraulic pumps 34 and 34' illustrated in FIG. 2 (i.e., stop the electric motor 35), and switch the open/close valves 40 and 40' from the valve open positions to the valve close positions. The master cylinder shutoff control valves 24 and 24' are maintained switched from the valve open positions to the valve close positions as described above. As a result, the disk brake 41 on each of the rear wheels 3 (RR and RL) is placed into a state of maintaining the hydraulic pressure in the cylinder portion 46.

In a subsequent step, step 15, the parking brake starts being released in a similar manner to the above-described first embodiment (step 2 illustrated in FIG. 4), and the electric motor 35 (the output shaft 53B) of the disk brake 41 starts rotating in the reverse direction from the direction at the time of application of the parking brake. At this time, the thrust force E applied on the piston 49 of the disk brake 41 by the rotation/linear motion conversion mechanism 50 is gradually reducing after, for example, time T1 as indicated by the characteristic line 58 drawn by the solid line in FIG. 6, and reaches the zero level at, for example, time T3 so as to release the braking force.

In a subsequent step, step 16, the control unit 13 determines whether the release of the parking brake has been completed, i.e., whether the piston 49 of the disk brake 41 has moved in the retracting direction to reach the desired braking release position according to the reverse rotation of the electric motor 53 via the rotation/linear motion conversion mechanism 50. If the control unit 13 determines "NO" in step 16, this means that the release of the parking brake has not been completed yet. Therefore, while this state is maintained, the control unit 13 waits until the piston 49 retracts to the above-described braking release position. In other words, the control unit 13 waits until the operation of the parking brake is released so that the thrust force F reaches the zero level at, for example, time T3 illustrated in FIG. 6.

Subsequently, it the control unit 13 determines "YES" in step 16, this means that the operation as the parking brake is released. Therefore, the processing proceeds to step 17, in which the control unit 13 releases the maintenance of the hydraulic pressure by the ESC 11. More specifically, the control unit 13 controls the ESC 11 to return the master cylinder shutoff control valves 24 and 24' illustrated in FIG. 2 from the valve close positions to the valve open positions, thereby establishing communication between the first pipe line portions 22 and 22' and the second pipe line portions 23 and 23' of the brake pipe lines 21 and 21' and the cylinder-side hydraulic pipes 10A and 10B. This triggers an immediate reduction of the hydraulic pressure P in the cylinder portion 46 at the disk brake 41 on each of the rear wheels 3 (RR and RL).

Therefore, as illustrated in FIG. 5(B), the piston seal 56 of the disk brake 41 can exert the rollback function with the aid of its elastic restoring force, thereby succeeding in returning the piston 49 to the normal braking release position. Accordingly, when the parking brake is released, the piston 49 can be returned to the desired position by the piston seal 56, whereby it is possible to prevent occurrence of a drag of the brake pad 43 or the like.

In this manner, the thus-configured second embodiment can also realize the pressure increase controller, which is a constituent feature of the present invention, by the processes of steps 12 to 17 illustrated in FIG. 7, and acquire a substantially similar effect to the above-described first embodiment. If the brake pedal 6 is operated by being pressed during execution of the processing as the pressure increase controller according to steps 12 to 17 illustrated in FIG. 7, preferably, the control unit 13 interrupts the hydraulic maintaining control by the ESC 11 according to a detection signal from the pedal switch 6A, thereby canceling the increase in the hydraulic pressure in the cylinder portion 46.

The second embodiment has been described based on the example in which the hydraulic maintaining control by the ESC 11 is performed by switching the master cylinder shutoff control valves 24 and 24' illustrated in FIG. 2 from the valve open positions to the valve close positions. However, the present invention is not limited to this example, and may be configured to perform the hydraulic maintaining control by the ESC 11 by switching the pressure increase control valves 28 and 28' as the valve unit disposed in the pipe line from the valve open positions to the valve close positions.

The second embodiment has been described based on the example that employs the hydraulic supply apparatus (ESC) 11 that uses the hydraulic pumps 34 and 34' to be rotationally drive by the electric motor 35 as the hydraulic source, as the hydraulic generator capable of generating a hydraulic pressure even when no operation is performed on the brake pedal 6. However, the present invention is not limited to this example, and may be configured in such a manner that, for example, the hydraulic supply apparatus (ESC) is omitted, and a hydraulic pump capable of working as the hydraulic source is provided in the pipe line for supplying a hydraulic pressure to the caliper and is used as the hydraulic generator.

Figure 8:
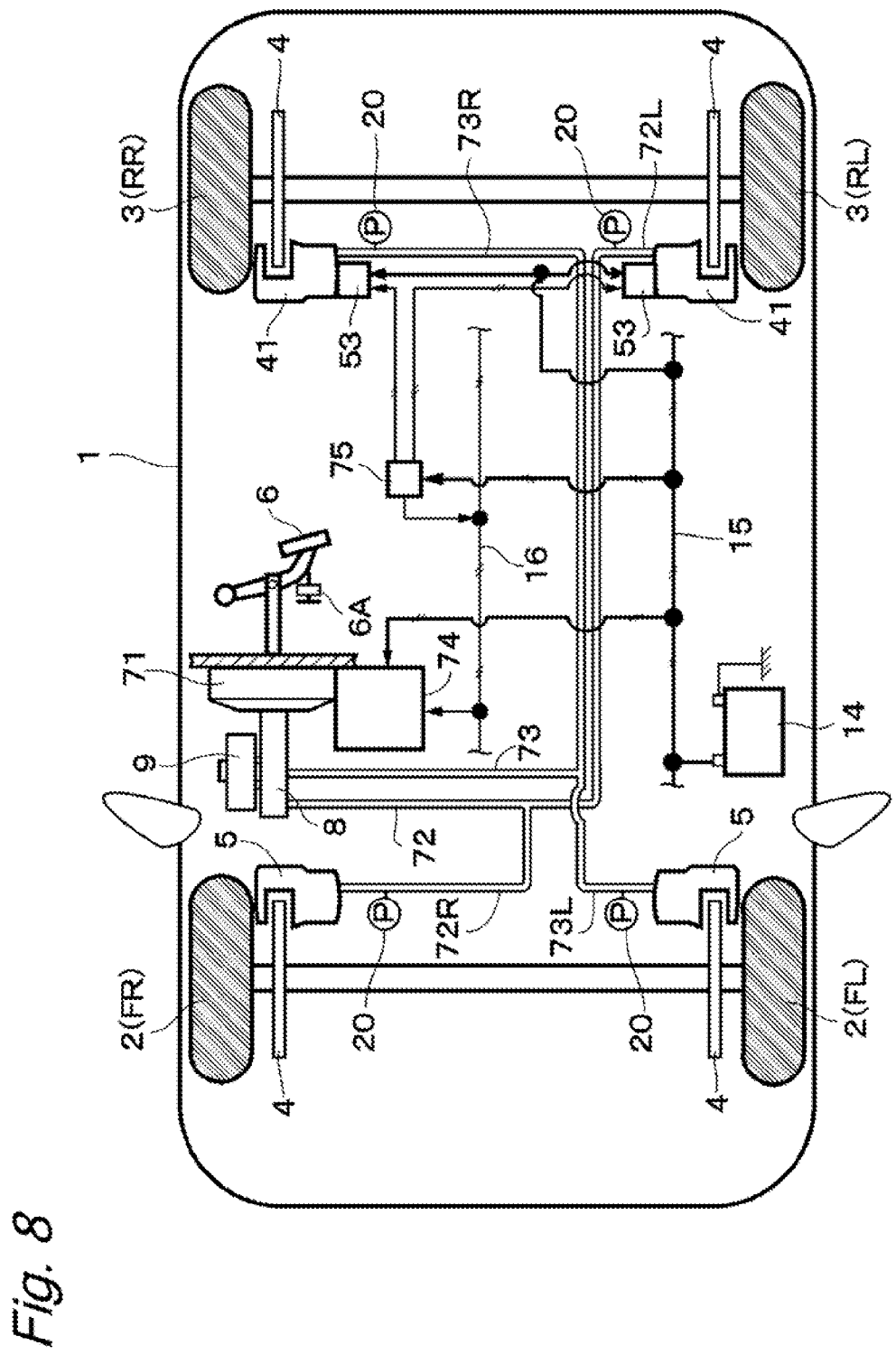
FIG. 8 illustrates a configuration of a brake system of a four-wheeled automobile including a brake apparatus according to a third embodiment.
Figure 9:
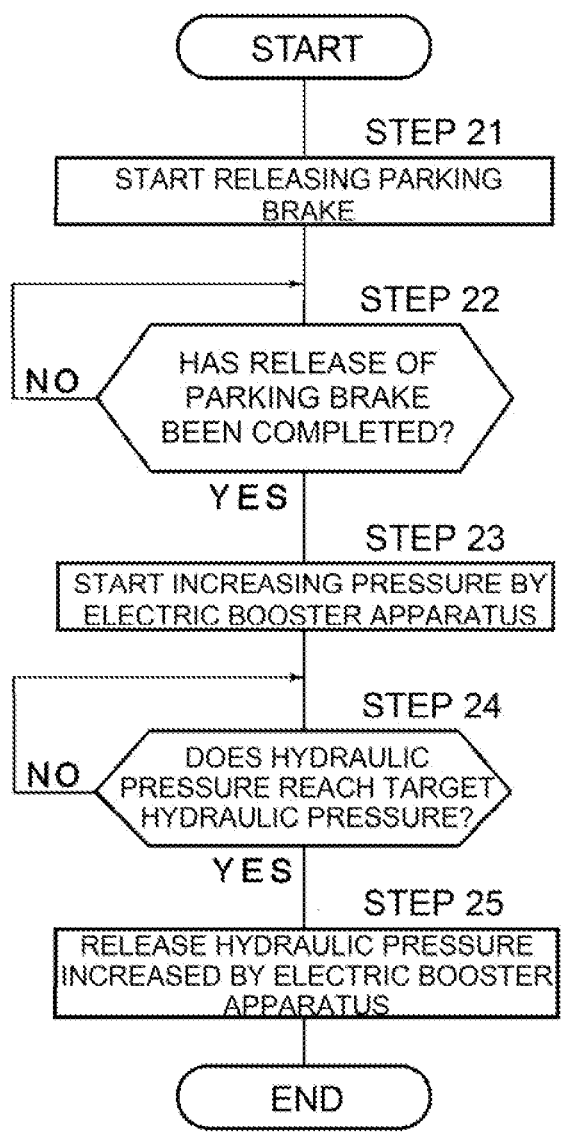
FIG. 9 is a flowchart illustrating control processing when the parking brake is released according to the third embodiment.

Next, FIGS. 8 and 9 illustrate a third embodiment of the present invention. The present embodiment is characterized in that it is configured to generate a brake hydraulic pressure with use of an electric booster apparatus, and realize the hydraulic pressure increase controller by this electric booster apparatus. In the following description of the third embodiment, similar components to the above-described first embodiment will be identified by the same reference numerals as the first embodiment, and descriptions thereof will be omitted below.

In FIG. 8, reference numeral 71 denotes the electric booster apparatus as the hydraulic generator employed in the present embodiment. This electric booster apparatus 71 is provided instead of the booster apparatus 7 described in the first embodiment. An input side of the electric booster apparatus 71 is connected to the brake pedal 6, and an output side of the electric booster apparatus 71 is connected to the master cylinder 8. The electric booster apparatus 71 contains an electric motor (not illustrated) configured to be driven and controlled by a booster control apparatus 74, which will be described below.

When the electric motor is driven according to a pressing operation performed on the brake pedal 6, the electric booster apparatus 71 actuates the master cylinder 8 thereby to generate a hydraulic pressure in each of hydraulic pipes 72 and 73, which will be described below. At this time, the hydraulic pressure generated from the master cylinder 8 is variably controlled by the electric booster apparatus 71 according to the pressing operation (i.e., a stroke or a pressing force) performed on the brake pedal 6.

Even when the brake pedal 6 is not operated by being pressed, in the electric booster apparatus 71, the electric motor can be driven and controlled by the booster control apparatus 74, which will be described below. Even in this case, the electric booster 71 can actuate the master cylinder 8 to generate a hydraulic pressure in each of the hydraulic pipes 72 and 73 according to a control signal from the booster control apparatus 74. In other words, the electric booster apparatus 71 operates as the hydraulic generator capable of generating a hydraulic pressure in the cylinder portion 46 when no operation is performed on the brake pedal 6.

The hydraulic pressure generated by the master cylinder 8 is supplied to the respective disk brakes 5 and 41 via the pair of hydraulic pipes 72 and 73 as the pipe line. A distal end side of the hydraulic pipe 72, which is one of the pair of the hydraulic pipes 72 and 73, is divided into two brake-side pipe portions 72R and 72L as the pipe line. The brake-side pipe portion 72R is connected to the disk brake 5 on the front right wheel (FR) 2. The brake-side pipe portion 72L is connected to the disk brake 41 equipped with the parking brake, which is mounted on the rear left (RL) wheel 3.

A distal end side of the hydraulic pipe 73, which is the other of the pair of the hydraulic pipes 72 and 73, is divided into two brake-side pipe portions 73L and 73R as the pipe line. The brake-side pipe portion 73L is connected to the disk brake 5 on the front left wheel (FL) 2. The brake-side pipe portion 73R is connected to the disk brake 41 equipped with the parking brake, which is mounted on the rear right (RR) wheel 3. The pressure sensor 20 described in the first embodiment is provided in each of the brake-side pipe portions 72L, 72R, 73L, and 73R.

Reference numeral 74 denotes the booster control apparatus as a controller for controlling the operation of the electric booster apparatus 71. The booster control apparatus 74 is constituted by a microcomputer and the like, and power is supplied thereto from the battery 14 via the power source line 15. As illustrated in FIG. 8, an input side of the booster control apparatus 74 is connected to the pedal switch 6A, the pressure sensors 20, a parking brake switch 75 that will be described below, and the like via the vehicle data bus 16. An output side of the booster control apparatus 74 is connected to the electric booster apparatus 71 so as to be able to supply power to the electric booster apparatus 71.

The booster control apparatus 74 includes a storage unit (not illustrated) constituted by, for example, a flash memory, a ROM, or a RAM. This storage unit stores, for example, a processing program to be used in control processing when the parking brake is released illustrated in FIG. 9, which will be describe below. In other words, the booster control apparatus 74 performs control for temporarily increasing the hydraulic pressure at the disk brake 41 on each of the rear wheels 3 when the parking brake is released (when braking by the parking brake is stopped) according to the processing program illustrated in FIG. 9 (more specifically, processing as the pressure increase controller indicated by steps 23 to 25 illustrated in FIG. 9).

Reference numeral 75 denotes the parking brake switch employed in the third embodiment. The parking brake switch 75 is configured in a substantially similar manner to the parking brake switch 17 described in the first embodiment. When the parking brake switch 75 is operated, the disk brake 41 on each of the rear wheels 3 operates as the parking brake. To release the operation as the parking brake, the parking brake switch 75 is operated to the braking release side. At this time, the disk brake 41 is released from the operation as the parking brake.

Next, the control processing by the booster control apparatus 74 when the parking brake is released will be described according to the processing program illustrated in FIG. 9.

Upon a start of the processing operation illustrated in FIG. 9, in step 21, the parking brake starts being released. At this time, the parking brake is released when the parking brake switch 75 is operated to the braking release side. In a subsequent step, step 22, the booster control apparatus 74 determines whether the release of the parking brake has been completed. While the booster control apparatus 74 determines "NO" in step 22, the booster control apparatus 74 waits until the release of the parking brake has been completed.

In other words, the thrust force F applied on the piston 49 of the disk brake 41 by the rotation/linear motion conversion mechanism 50 is in a highly braking state, for example, from time 0 to time T1 as indicated by the characteristic line 58 drawn by the solid line illustrated in FIG. 6. When the release request is issued by the operation of the parking brake switch 75 at time Tr, the thrust F applied on the piston 49 starts reducing with, for example, a slight time lag. This thrust force F is gradually reducing after time T1, and reaches the zero level at, for example, time T3 so as to release the braking force.

When the thrust force E reduces to reach the zero level to complete the release of the parking brake at time T3 illustrated in FIG. 6, the booster control apparatus 74 determines "YES" in step 22. Therefore, in a subsequent step, step 23, the booster control apparatus 74 outputs a control signal for starting a pressure increase to the electric booster apparatus 71, and drives and controls the above-described electric motor of the electric booster apparatus 71. This control actuates the master cylinder 8 to increase the hydraulic pressure in each of the hydraulic pipes 72 and 73 (the brake-side pipe portions 72L, 72R, 73L, and 73R). As a result, the hydraulic pressure in the cylinder portion 46 of the disk brake 41 increases, for example, as indicated by a characteristic line 76 drawn by an alternate long and short dash line in FIG. 6.

In a subsequent step, step 24, the booster control apparatus 74 detects the hydraulic pressure in each of the brake-side pipe portions 72L and 73R by the pressure sensor 20, and determines whether the detected hydraulic pressure reaches a predetermined target hydraulic pressure Pb. If the booster control apparatus 74 determines "NO" in step 24, this means that the hydraulic pressure in each of the cylinder portions 46 does not increase to the target hydraulic pressure Pa. Therefore, while this state is maintained, the booster control apparatus 74 continues the operation of the master cylinder 8 in a pressure increase direction by the electric booster apparatus 71.

This hydraulic pressure Pb is set to a pressure lower than a pressure to generate a braking force (the thrust force F illustrated in FIG. 6) required when the parking brake is applied but necessary to elastically deform the piston seal 56 as illustrated in FIG. 5(A). In this case, the target hydraulic pressure Pb is set to a higher pressure value than the target hydraulic pressure Pa described in the second embodiment (Pb>Pa). This is because the hydraulic pressure increase control by the electric booster apparatus 71 is performed after the release of the parking brake has been completed.

If the booster control apparatus 74 determines "YES" in step 24, and the hydraulic pressure in each of the cylinder portions 46 increases to the target hydraulic pressure Pb, the processing proceeds to a subsequent step, step 25, in which the booster control apparatus 74 stops the operation of the master cylinder 8 by the electric booster apparatus 71, and performs hydraulic release control. As a result, the hydraulic pressure in the cylinder portion 46 reduces to reach the zero level pressure at time T5 after reaching the target hydraulic pressure Pb at time T as indicated by the characteristic line 76 illustrated in FIG. 6.

Therefore, as illustrated in FIGS. 5 (A) and (B), the piston seal 56 of the disk brake 41 can exert the rollback function with the aid of its elastic restoring force, thereby succeeding in returning the piston 49 to the normal braking release position. Accordingly, when the parking brake is released, the piston 49 can be returned to the desired position by the piston seal 56. Therefore, it is possible to secure a space for separating the brake pad 43 from the disk rotor 4 rotating when the vehicle is running, thereby preventing occurrence of a drag of the brake pad 43 or the like.

In this manner, the thus-configured third embodiment can also realize the pressure increase controller, which is a constituent feature of the present invention, by the processes of steps 23 to 25 illustrated in FIG. 9, and acquire a substantially similar effect to the above-described first embodiment. If the brake pedal 6 is operated by being pressed during execution of the processing as the pressure increase controller according to steps 23 to 25 illustrated in FIG. 9, preferably, the booster control apparatus 74 interrupts its pressure increase control according to a detection signal from the pedal switch 6A, causing the electric booster apparatus 71 to operate according to the pedal operation.

The third embodiment has been described based on the example in which the hydraulic pressure in the cylinder portion 46 is controlled to increase based on a control signal from the booster control apparatus 74 by employing the electric booster apparatus 71. However, the present invention is not limited to this example, and may be configured to perform the hydraulic pressure increase control by, for example, using a combination of the hydraulic supply apparatus (ESC 11) and the electric booster apparatus described in the first and second embodiments.

The above-described respective embodiments have been described based on the example in which the disk brake 41 on the rear wheel side is used as the parking brake with use of the electric motor 53. However, the present invention is not limited to this example, and may be configured to include, for example, an operation lever or the like for the parking brake near the driver's seat of the vehicle, and transmit an operation performed on this operation lever to the parking brake mechanism (for example, the rotation/linear motion conversion mechanism 50 for thrusting the piston 49 of the disk brake 41) via an operation transmission unit such as a push-pull wire, a cable, or the like. The present invention may be employed for a brake apparatus including a disk brake equipped with a cable type electric parking brake configured to apply the parking brake by pulling cordage (for example, a cable) with use of an actuator such as an electric motor.

Even in this case, the hydraulic pressure in the hydraulic cylinder (for example, the cylinder portion 46 of the disk brake 41) can be temporarily increased by the pressure increase controller, and this hydraulic pressure allows the piston seal 56 to be largely elastically deformed to exert the rollback function with the aid of its elastic restoring force, thereby returning the piston 49 to its normal braking release position.

Further, the above-described respective embodiments have been described based on the example in which the disk brake 41 equipped with the electric parking brake is used as the left and right brakes on the rear wheel side. However, the present invention is not limited to this example, and may be employed for an example in which the disk brake equipped with the electric parking brake is used as the brakes on all of the four wheels.

Next, aspects of the present invention included in the above-described respective embodiments will be described. The pressure increase controller is configured to pressurize the hydraulic cylinder with use of the hydraulic generator disposed in the pipe line for supplying the hydraulic pressure into the caliper and capable of generating the hydraulic pressure even when no operation is performed on the brake pedal. According to this configuration, it is possible to temporarily increase the hydraulic pressure in the hydraulic cylinder with use of the hydraulic generator to increase the deformation amount of the elastic seal to acquire the sufficient rollback function.

The pressure increase controller is configured to close the valve unit disposed in the pipe line for supplying the hydraulic pressure into the caliper. In this case, closing the valve unit can temporarily increase the hydraulic pressure in the hydraulic cylinder according to the retraction of the piston into the hydraulic cylinder to increase the deformation amount of the elastic seal to acquire the sufficient rollback function.

In this case, the pressure increase controller may be configured to increase the hydraulic pressure in the hydraulic cylinder during the release of the holding of the piston by the piston holding mechanism. The pressure increase controller may be configured to release the hydraulic pressure in the hydraulic cylinder after the release of the holding of the piston by the piston holding mechanism. The pressure increase controller may be configured to increase the hydraulic pressure in the hydraulic cylinder after the release of the holding of the piston by the piston holding mechanism. The pressure increase controller may be configured to release the hydraulic pressure in the hydraulic cylinder after the hydraulic pressure in the hydraulic cylinder increases to a predetermined pressure (for example, the target hydraulic pressure Pb indicated by the characteristic line 76 illustrated in FIG. 6).

Further, the pressure increase controller is configured to cancel the increase in the hydraulic pressure in the hydraulic cylinder when the brake pedal is operated. According to this configuration, when the brake pedal is operated by being pressed during execution of the processing as the pressure increase controller, the disk brakes on the front wheel sides and the disk brakes on the rear wheel sides can provide braking forces according to the pressing operation performed on the brake pedal.

REFERENCE SIGNS LIST

1 vehicle body
2 front wheel (vehicle wheel)
3 rear wheel (vehicle wheel)
4 disk rotor
6 brake pedal
8 master cylinder
9 master reservoir
10A, 10B cylinder-side hydraulic pipe (pipe line)
11 hydraulic supply apparatus (ESC, hydraulic generator)
12A, 12B, 12C, 12D, 72L, 72R, 73L, 73R brake-side pipe portion (pipe line)
13 control unit (hydraulic supply apparatus controller, controller)
17, 75 parking brake switch
18 parking brake control apparatus
20 pressure sensor (hydraulic detector)
21, 21' brake pipe line (pipe line)
22, 22' first pipe line portion (pipe line)
23, 23' second pipe line portion (pipe line)
24, 24' master cylinder shutoff control valve (valve unit)
28, 28' pressure increase control valve (valve unit)
34, 34' hydraulic pump
41 disk brake equipped with parking brake
42 mount member
43 brake pad
44 caliper
46 cylinder portion (hydraulic cylinder)
49 piston
50 rotation/linear motion conversion mechanism (piston thrust mechanism)
51 screw member (piston holding mechanism)
52 linearly movable member (piston holding mechanism)
53 electric motor
56 piston seal (elastic seal)
71 electric booster apparatus (hydraulic generator)
72, 73 hydraulic pipe (pipe line)
74 booster control apparatus (controller)

The invention claimed is:

1. A brake apparatus comprising:
a caliper (44) including a piston (49) sealed by an elastic seal (56) provided in a hydraulic cylinder (46), and configured to press brake pads (43) disposed on both surfaces of a disk (4) with use of the piston (49) by supply of a hydraulic pressure into the hydraulic cylinder (46) according to an operation performed on a brake pedal (6);
a piston thrust mechanism (50) disposed in the caliper (44), and configured to thrust the piston (49) by an external force independently from the supply of the hydraulic pressure;
a piston holding mechanism (51, 52) disposed in the caliper (44) and configured to hold the piston (49) thrust by the piston thrust mechanism (50); and
a pressure increase controller (13, 74) configured to set a target hydraulic pressure (Pa), and to temporarily increase the hydraulic pressure in the hydraulic cylinder (46) to a predetermined target hydraulic pressure (Pa), after starting to release the piston held by the piston holding mechanism (51, 52),
wherein the target hydraulic pressure (Pa) is lower than a pressure necessary to generate a thrust force (F) for thrusting, by the piston thrust mechanism (50), the piston to a position for holding the piston (49) before releasing the piston held by the piston holding mechanism (51, 52).

2. The brake apparatus according to claim 1, wherein the pressure increase controller (13, 74) is configured to pressurize the hydraulic cylinder (46) with use of a hydraulic generator (11, 71) disposed in a pipe line (10A, 10B, 72, 73) for supplying the hydraulic pressure into the caliper (44), and capable of generating the hydraulic pressure even when no operation is performed on the brake pedal (6).

3. The brake apparatus according to claim 1, wherein the pressure increase controller (13) is configured to close a valve unit (24, 24', 28, 28') provided in a pipe line (21, 21', 23, 23') for supplying the hydraulic pressure into the caliper (44).

4. The brake apparatus according to claim 1, wherein the pressure increase controller (13) is configured to increase the hydraulic pressure in the hydraulic cylinder (46) during the release of the holding of the piston (49).

5. The brake apparatus according to claim 4, wherein the pressure increase controller (13) is configured to release the hydraulic pressure in the hydraulic cylinder (46) after the release of the holding of the piston (49) has been completed.

6. The brake apparatus according to claim 1, wherein the pressure increase controller (74) is configured to increase the hydraulic pressure in the hydraulic cylinder (46) after the release of the holding of the piston (49) has been completed.

7. The brake apparatus according to claim 6, wherein the pressure increase controller (74) is configured to release the hydraulic pressure in the hydraulic cylinder (46) after the hydraulic pressure in the hydraulic cylinder (46) increases to a predetermined pressure.

8. The brake apparatus according to claim 1, wherein the pressure increase controller (13, 74) is configured to cancel the increase in the hydraulic pressure in the hydraulic cylinder (46) when the brake pedal (6) is operated.

9. The brake apparatus according to claim 1, wherein the pressure increase controller (13, 74) is configured to move the piston (49) into the hydraulic cylinder (46) while maintaining the hydraulic pressure in the hydraulic cylinder (46).

10. The brake apparatus according to claim 1, wherein the target hydraulic pressure (Pa), which is lower than the pressure necessary to generate the thrust force (F) by the piston thrust mechanism, is sufficient to elastically deform the piston seal (56).

* * * * *